United States Patent [19]

Daude-Lagrave

[11] 4,220,529

[45] Sep. 2, 1980

[54] OXIDATIVE PURIFICATION OF WATER

[75] Inventor: Marie-Christine Daude-Lagrave, Paris, France

[73] Assignee: Produits Chimiques Ugine Kuhlmann, Paris, France

[21] Appl. No.: 698,853

[22] Filed: Jun. 23, 1976

[30] Foreign Application Priority Data

Aug. 22, 1975 [FR] France .............................. 75 25974

[51] Int. Cl.² .............................................. C02C 5/04
[52] U.S. Cl. .................................... 210/758; 210/904
[58] Field of Search ............... 210/50, 63 R, DIG. 31

[56] References Cited

U.S. PATENT DOCUMENTS

| | | | |
|---|---|---|---|
| 1,078,918 | 11/1913 | Gruter | 210/62 |
| 3,454,427 | 7/1969 | Suzuki et al. | 210/50 |
| 3,617,567 | 11/1971 | Mathre | 210/50 |
| 3,843,516 | 10/1974 | Yamada et al. | 210/63 R |

FOREIGN PATENT DOCUMENTS 2352856  4/1975  Fed. Rep. of Germany ... 210/DIG. 31

*Primary Examiner*—Thomas G. Wyse
*Attorney, Agent, or Firm*—Pennie & Edmonds

[57] ABSTRACT

The present invention relates to a process of water treatment, particularly of industrial aqueous effluents and of water from watercourses, such as rivers, lakes, ponds, and the like, comprising oxidation with singlet oxygen.

4 Claims, No Drawings

OXIDATIVE PURIFICATION OF WATER

BACKGROUND OF THE INVENTION

The use of oxidizing agents, such as hydrogen peroxide, chlorine or sodium hypochlorite, for water purification is known in the art, particularly for the treatment of industrial effluents containing toxic substances, such as cyanides, cyanohydrins, phenols, and for reducing the chemical demand for oxygen of raw water charged with organic materials used for obtaining potable water. Thus, numerous methods have been proposed for eliminating, from cyanide-containing water, the cyanides which, because of their toxicity, are particularly dangerous residues.

The oxidation of cyanides with chlorine or hypochlorite is a process that is frequently used, leading to cyanates and then, with the use of an excess of oxidizing agent, to carbon dioxide and ammonia. This treatment has the advantage that through measurement of the redox potential it permits easy regulation of the reaction. However, the pH of the treated water should be comprised between 11.5 and 12, which often makes it necessary to adjust the pH before and after treatment. Such an operation is frequently very delicate as well as onerous, particularly in the case of continuous treatment. Moreover, the addition of chlorine or hypochlorite increases the salinity of the water.

The method consisting of oxidation of cyanides into cyanates by means of hydrogen peroxide may also be used. This process has the advantage that it does not require any readjustment of the pH and does not increase the salinity of the water. It is particularly well adapted to the discontinuous treatment of concentrated industrial effluents. By contrast, the oxidation of dilute solutions with $H_2O_2$ is a very slow process, and it is necessary to accelerate it by using a rather large amount of a copper salt as catalyst. As a matter of fact, a molar ratio $H_2O_2/CN^-$ of close to 3 is required in that case, which increases the cost of treatment.

The oxidation of cyanohydrins with hydrogen peroxide has been the subject of a French Patent (No. 2,126,576, filed February 11, 1971). According to the procedure described in this patent, the cyanohydrins are converted into easily hydrolyzable oxamides. The amount of hydrogen peroxide to be used is lower than that required for the oxidation of cyanides; a molar ratio $H_2O_2/CN^-$ of close to 2 is generally sufficient; moreover, the use of a catalyst is not required.

The phenols may also be oxidized by various reagents, of wich chlorine dioxide is particularly well adapted to this treatment. Hydrogen peroxide may also be employed in the presence of ferrous iron as catalyst, but the molar ratio $H_2O_2/C_6H_5OH$ to be used must be high, generally greater than 9.

The chemical oxidation of organic matter contained in river water is generally accomplished by means of sodium hypochlorite or chlorine dioxide. The use of hydrogen peroxide is possible in the presence of a ferrous salt, but requires that the operation be carried out at a pH of close to 4, which make it difficult to use this process for the treatment of raw water.

SUMMARY OF THE INVENTION

A process has now been found which makes it possible, regardless of the initial concentrations of toxic products contained in industrial effluents, such as cyanides, sulfocyanides, cyanohydrins, phenols, nitrites, sulfides, aldehydes, hexavalent chromium, to obtain effluents of practically zero residual toxic matter content under particularly advantageous conditions, as well as to reduce the chemical oxygen demand of raw water to a considerable extent.

Briefly stated, the present invention comprises oxidative purification of a water source by the use of singlet oxygen added to said water or formed in situ in said water source.

DETAILED DESCRIPTION

In a singlet state, all electrons of a molecule compensate their spins two by two, while in the triplet state two electrons are present with their spins parallel. In the majority of cases, the ground state of molecules is a singlet state, with oxygen being a notable exception because its normal state is a triplet, and the two possible singlet states are obtained only by certain chemical reactions or by photochemical treatment of triplet oygen. In the formulas that follow, where singlet oxygen is used, it will be depicted as $^1O_2$.

Singlet oxygen, which may be prepared by various chemical or photochemical procedures, has been described by various authors, in particular by E. McKeown and William A. Waters in *J. Chem. Soc. (B)* 1966, 1040–1046, and by Charles Tanielian and Maurice Latort in *Chemie et Industrie*, Genie Chemique, 102–6, October 1969.

Any water source can be treated in accordance with the present invention including industrial aqueous effluents and water from watercourses (raw water), such as rivers, lakes, ponds, and the like.

Two known chemical methods have been used for preparing singlet oxygen, since they make use of industrially available reactions at a low cost; the reaction of hydrogen peroxide with sodium hypochlorite and the reaction of hydrogen peroxide with bromine, according to the following reactions:

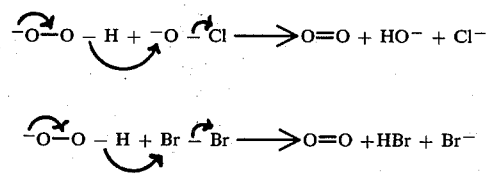

In the case of treatment of cyanide-containing water aqueous effluents containing cyanide, the action of singlet oxygen on the cyanide leads to the formation of cyanates according to the reaction:

$$2CN^- + {}^1O_2 \rightarrow 2CNO^-$$

Comparison of the action of singlet oxygen generated by the $H_2O_2$-NaOCl couple or the $H_2O_2$-$Br_2$ couple with that of these oxidizing agents used separately shows that the results achieved with singlet oxygen are highly superior. The speed of the reaction is greater while requiring only the use of a slight excess of oxidizing agent. Moreover, the ease of regulation is preserved, and generally it is not necessary to modify the pH of the treated waters; the same advantages are met within the treatment of cyanohydrins with the same reagent.

Single oxygen is also effective in destroying phenols; the use of this reagent is more advantageous than that of hydrogen peroxide alone, since it does not require the presence of a catalyst.

Single oxygen also permits the elimination of an important part of the organic matter contained in raw water, thereby substantially reducing the latter's chemical requirement of oxygen, which is very often necessary when the drinking water supply of large cities must be prepared from river water.

The use, for the in situ preparation in water, of singlet oxygen generated by the reaction of hydrogen peroxide with sodium hypochlorite has been found to be the most practical and economical process. Hence, the invention will be described in connection with the use of this technique, but any other mode of preparation of excited singlet oxygen may be used for the treatment of water according to the invention.

According to this preferred mode of the process of the invention, the couple $H_2O_2$-NaOCl, in a ratio of 1 mole of $H_2O_2$ to 1 mole of NaOCl, is made to act on the water or aqueous solution to be treated according to the reaction (1):

$$NaOCl + H_2O_2 \rightarrow NaCl + H_2O + {}^1O_2 \quad (1)$$

while maintaining the reaction medium at a pH of between 7 and 12, preferably close to 9. In practice, a slight excess of $H_2O_2$ relative to the NaOCl, of the order of 1% to 5%, facilitates the control of the reaction.

In the case of treatment of cyanide-containing water, a pH of less than 9 would cause a spontaneous evolution of volatile and highly toxic hydrogen cyanide, but, in practice, the cyanide-containing effluents are generally alkaline, and the reagents may, therefore, be introduced without readjustment of the pH.

The method is applicable to any cyanide-containing aqueous effluent regardless of its concentration of toxic products, for example, to effluents having a $CN^-$ ion concentration of 0.1 g/l to 100 g/l; i.e., it is as effective for the treatment of dilute solutions as well as concentrated solutions; however, in the case of highly concentrated solutions, it is generally necessary to introduce the reagents gradually in order to prevent the temperature of the solution from rising too rapidly.

Owing to the high degree of activity of singlet oxygen, it is generally unnecessary to add a considerable excess of oxidizing agent in order to obtain total destruction of the toxic substances. In the case of cyanides, a 20 to 40% excess of singlet oxygen relative to the stoichiometric amount is generally sufficient, which shows the superiority of this method of treatment over the treatments previously known in the art. For effluents containing cyanohydrins, the oxygen/$CN^-$ ratio should generally range between 2 and 3, and in the case of phenols, the molar ratio of oxygen to phenol varies with the phenol concentration and should generally range between 4 and 10 for the phenol $C_6H_5OH$.

When using the method of the present invention for the treatment of raw water, it is important to make sure, when determining the amounts of oxidizing agent to be used, that the total amount of oxidizable impurities contained in the water is taken into account.

The destruction of cyanides and phenols and the treatment of raw river water by the singlet oxygen process takes place at ambient temperature, i.e., at temperatures which may range between 5° C. and 20° C.; but the treatment may, without any adverse effects, be carried out at higher temperatures if that should be the case of the water to be treated; moreover, in the treatment of cyanohydrins, it has been noted that the oxidation is enhanced if the temperature is increased to 80° C. at the end of the treatment.

The speed of oxidation of the substances to be eliminated by the treatment with single oxygen is very high at all concentrations. The reaction is practically immediate in dilute solutions and raw water, since there is no risk of a temperature rise. By contrast, in the case of concentrated solutions, e.g., those with an oxidizable product concentration above 10 g/l, a longer reaction time is required in practice; 20 minutes for the destruction of cyanides and 45 minutes for that of phenols, since the reagents must be brought into contact with the effluents more gradually in order to prevent an overly great increase in temperature.

The reagents which generate singlet oxygen may be added to the water to be treated in any given order. However, for a discontinuous treatment of effluents, it is generally preferable to first add all or part of the hydrogen peroxide in the form of an aqueous solution whose concentration may range from 1 to 70%, then introduce the sodium hypochlorite at a chlorometric concentration of 1° to 50°. To limit the temperature rise of the effluents, if they are concentrated, it is often preferable to introduce the two oxidizng agents in the form of a dilute solution.

The mode of introduction of the reagents into the water to be treated is particularly important. To avoid loss of singlet oxygen due to an overly rapid evolution, the reagents should be introduced into the midst of the solution to be treated while maintaining gentle agitation; in the case of continuous treatment of raw water or dilute effluents, the agitation created by the liquid current itself is most often sufficient.

The amounts of reagents used for the treatments may be controlled by any appropriate device, the use of metering pumps generally giving satisfaction. The purification reaction must also be controlled, and it is practical to do this by potentiometry with the aid of a couple of redox gold-calomel electrodes, with the change to a positive potential indicting the end of the reaction. However, it is necessary to calibrate the potentiometers used in each case, since certain industrial effluents may present shifts at the end of the reaction.

Moreover, it has been observed that, in order to facilitate the regulation, it is preferable that the hydrogen peroxide always be present in a slight excess—of the order of 1 to 5%—relative to the sodium hypochlorite.

The following examples are given to illustrate the best modes for carrying out the present invention but are not to be construed as restricting the scope thereof.

In these examples, the cyanide, in the form of $CN^-$, was determined by the two classical methods; colorimetry with pyridine-pyrazolone and the use of an electrode specific to $CN^-$ ions; the phenols were determined by the 4-aminoantipyrine method; and the chemical demand for oxygen by French Standard T 90-101.

EXAMPLE 1

One liter of an aqueous solution containing 0.1885 g of sodium cyanide per liter (the equivalent of 100 mg of $CN^-$) is treated at 20° C. with 2.5 ml of 3.5% $H_2O_2$ and 14.5 ml of NaOCl of 5° chlorometric strength, which corresponds to a molar ratio ${}^1O_2/CN^- = 1.32$. At the end of 3 minutes, the $CN^-$ content of the treated solution is less than 0.1 mg/l.

EXAMPLE 2

200 ml of an aqueous solution containing 25.5 g of potassium cyanide per liter (the equivalent of 10 g of $CN^-$ per liter) is treated at 20° C. with 4 ml of 35% $H_2O_2$ and 23 ml of NaOCl of 50° chlorometric strength, which corresponds to a molar ratio $^1O_2/CN^- = 1.05$.

The hypochlorite should be added gradually to prevent the temperature of the solution from rising considerably. After 18 minutes, the $CN^-$ content of the treated solution is less than 0.4 mg/l.

EXAMPLE 3

To compare the action of oxygen in the singlet state with that of hydrogen peroxide on aqueous solutions of different cyanide concentrations, the following treatments are carried out:

A. One liter of an aqueous solution containing 0.1885 g of sodium cyanide per liter (the equivalent of 100 mg of $CN^-$) is treated at 20° C. with 9.9 ml of 3.5% $H_2O_2$, which corresponds to a molar ratio $H_2O_2/CN^- = 3$.

To accelerate the reaction, copper is added as catalyst in an amount of 100 mg of $CuSO_4.5H_2O$ per liter.

After 118 minutes, the $CN^-$ content of the treated solution is less than 0.1 mg/l.

B. One liter of an aqueous solution containing 18.85 g of sodium cyanide per liter (the equivalent of 10 g of $CN^-$) is treated at 20° C. with 99 ml of 35% $H_2O_2$, which corresponds to a molar ratio $H_2O_2/CN^- = 3$.

100 mg of $CuSO_4.5H_2O$ are also introduced into the solution.

After 10 minutes, the $CN^-$ content of the treated solution is less than 0.1 mg/l.

EXAMPLE 4

To compare the action of single oxygen with that of sodium hypochlorite on aqueous solutions of different sodium cyanide concentrations, the following treatments are carried out:

A. One liter of an aqueous solution containing 0.1885 g of sodium cyanide per liter (the equivalent of 100 mg of $CN^-$) is treated at 20° C. with 2.4 ml of NaOCl of 50° chlorometric strength, which corresponds to a molar ratio $NaOCl/CN^- = 1.40$.

The pH of the solution must be close to 12, while treatment with single oxygen requires only a pH of 9.

After 30 minutes the $CN^-$ content of the treated solution is less than 0.1 mg/l.

B. The cyanide concentration of the bath, expressed in $CN^-$, should not exceed 1 to 2 g/l, since the reaction is exothermal. At higher concentrations considerable temperature rises may occur which would lead to the evolution of cyanogen chloride.

Hence, to treat a solution containing 10 g of $CN^-$ per liter, the solution must be diluted.

Comparison of the results obtained in Examples 3 and 4 with those of Examples 1 and 2 reveal the superiority of the treatment of single oxygen over hydrogen peroxide and sodium hypochlorite used separately, regardless of the initial $CN^-$ concentration.

EXAMPLE 5

One liter of a solution containing 25 mg of potassium cyanide per liter (the equivalent of 10 mg of $CN^-$ per liter) is treated at 20° C. with 0.3 ml of 3.5% $H_2O_2$ and 1.5 ml of NaOCl of 5° chlorometric strength, which corresponds to a molar ratio $^1O_2/CN^- = 1.36$. The destruction of the cyanides is practically instantaneous.

EXAMPLE 6

One liter of an aqueous solution containing 255 mg of sodium cyanide per liter (the equivalent of 100 mg of $CN^-$ per liter) is treated at 20° C. with a mixture of hydrogen peroxide and bromide. The mixture is formed by first preparing a 1:100 dilution solution of pure bromine in 1 N NaOH and then admixing 1.3 ml of 7% $H_2O_2$ with 15 ml of this bromine solution. This corresponds to a molar ratio $^1O_2/CN^- = 1.5$.

After 15 minutes, the destruction of the cyanides is complete.

EXAMPLE 7

500 ml of an industrial effluent containing 480 mg of acrolein cyanohydrin per liter (the equivalent of 150 mg of $CN^-$ per liter) is treated at 20° C. by adding to the top of the effluent a reagent which consists of 21.3 ml of 0.7% $H_2O_2$ and 25 ml of NaOCl of 5° chlorometric strength corresponding to a molar ratio of $^1O_2/CN^- = 3$.

After 60 minutes the $CN^-$ content is less than 1 mg/l.

EXAMPLE 8

500 ml of the same effluent as in Example 7 is treated by introducing the same amounts of reagents, but operating at 80° C. The results are identical.

EXAMPLE 9

500 ml of the same effluent as in Example 7 is treated at 20° C. by introducing 18 ml of 0.7% $H_2O_2$ ane 21 ml of NaOCl of 5° chlorometric strength, which corresponds to a ratio $^1O_2/CN^- = 2.5$, and the temperature is gradually increased in 60 minutes from 20° C. to 80° C.

After 60 minutes the $CN^-$ content is less than 1 mg/l.

EXAMPLE 10

500 ml of the same effluent as in Example 7 is treated at 80° C. by introducing in the midst of the solution 16.5 ml of 0.7% $H_2O_2$ and 18.5 ml of NaOCl of 5° chlorometric strength, which corresponds to a ratio $^1O_2/CN^- = 2.2$.

After 30 minutes the $CN^-$ content is equal to 0.3 mg/l.

Compared with the results obtained in Example 7, the introduction of the reagents in the midst of the solution instead of a simple addition to the surface of the solution has made it possible to reduce the amount of reagents required for the treatment, with the ratio $^1O_2/CN^-$ being reduced from 3 to 2.2.

EXAMPLE 11

500 ml of an aqueous solution containing 100 mg of phenol $C_6H_5OH$ per liter is treated, at 20° C., with 5.5 ml of 7% $H_2O_2$ and 6 ml of HaOCl of 50° chlorometric strength, which corresponds to a ratio $^1O_2/phenol = 8.15$.

After 13 minutes, the residual phenol concentration is equal to 0.4 mg/l.

EXAMPLE 12

200 ml of an aqueous solution containing 1 g of phenol $C_6H_5OH$ per liter is treated, as in Example 11, at 20°, with 17 ml of 7% $H_2O_2$ and 17 ml of NaOCl of 50° chlorometric strength, which corresponds to a ratio $^1O_2/phenol = 6.1$.

After 44 minutes the phenol concentration is equal to 0.4 mg/l.

EXAMPLE 13

For the treatment, at 20° C., of one liter of river water having a chemical oxygen demand of 15.6 mg of $O_2$ per liter, hydrogen peroxide and sodium hypochlorite solutions are prepared with concentrations of 0.78 g of $O_2$ per liter and 3.46 g of $Cl_2$ per liter, respectively. 10 ml of each solution are introduced into the water to be treated.

After 10 minutes, the chemical oxygen demand drops to 7.8 mg of $O_2$ per liter, which corresponds to a 50% decrease in chemical oxygen requirement.

While the invention has been described in connection with the preferred embodiments, it is not intended to limit the invention to the particular forms set forth, but, on the contrary, it is intended to cover such alternatives, modifications, and equivalents as may be included within the spirit and scope of the invention as defined by the appended claims.

What is claimed is:

1. The method of oxidative purification of a cyanide-containing aqueous effluent water source comprising treating said water source with singlet oxygen to carry out the oxidative purification to the degree desired, the singlet oxygen is formed in situ by adding to said water source substantially equimolar amounts of hydrogen peroxide and sodium hypochlorite or bromine, the amount of singlet oxygen used is about 20% to 40% in excess of the stoichiometric amount required to react with the cyanide, and the temperature at which the oxidation is carried out is from about 5° to 80° C.

2. The method of claim 1 wherein the pH of the cyanide-containing aqueous effluent is maintained above about 9.

3. The method of oxidative purification of a cyanohydrin-containing aqueous effluent water source comprising treating said water source with singlet oxygen to carry out the oxidative purification to the degree desired, the singlet oxygen is formed in situ by adding to said water source substantially equimolar amounts of hydrogen peroxide and sodium hypochlorite or bromine, the amount of single oxygen used is such that the singlet oxygen/$CN^-$ molar ratio is between about 2 and 3, and the temperature at which the oxidation is carried out is from about 5° to 80° C.

4. The method of oxidative purification of a phenol-containing aqueous effluent water source comprising treating said water source with singlet oxygen to carry out the oxidative purification to the degree desired, the singlet oxygen is formed in situ by adding to said water source substantially equimolar amounts of hydrogen peroxide and sodium hypochlorite or bromine, the amount of singlet oxygen used is such that the single oxygen/phenol molar ratio is between about 4 and 10, and the temperature at which the oxidation is carried out is from about 5° to 80° C.

* * * * *

UNITED STATES PATENT AND TRADEMARK OFFICE
CERTIFICATE OF CORRECTION

PATENT NO. : 4,220,529
DATED : September 2, 1980
INVENTOR(S) : Marie-Christine Daude-Lagrave It is certified that error appears in the above-identified patent and that said Letters Patent are hereby corrected as shown below:

Column 2, line 67, )
Column 3, line 3, )
Column 5, line 36, )
Column 5, line 46, )  - reads "single", should read --singlet--
Column 5, line 58, )
Column 8, line 13, )

Column 6, line 6, reads "bromide", should read --bromine--

Column 6, line 55, reads "HaOCl", should read --NaOCl--.

Signed and Sealed this

Seventeenth Day of March 1981

[SEAL]

Attest:

RENE D. TEGTMEYER

Attesting Officer    Acting Commissioner of Patents and Trademarks